Aug. 6, 1968

R. A. BLAIR 3,395,594

POWER UNITS SUCH AS GEAR MOTORS WITH IMPROVED
MOTOR BASE AND ADAPTER ASSEMBLY

Filed Oct. 20, 1966

Inventor:
Ronald A. Blair,
by Henry J. Marminski
Attorney.

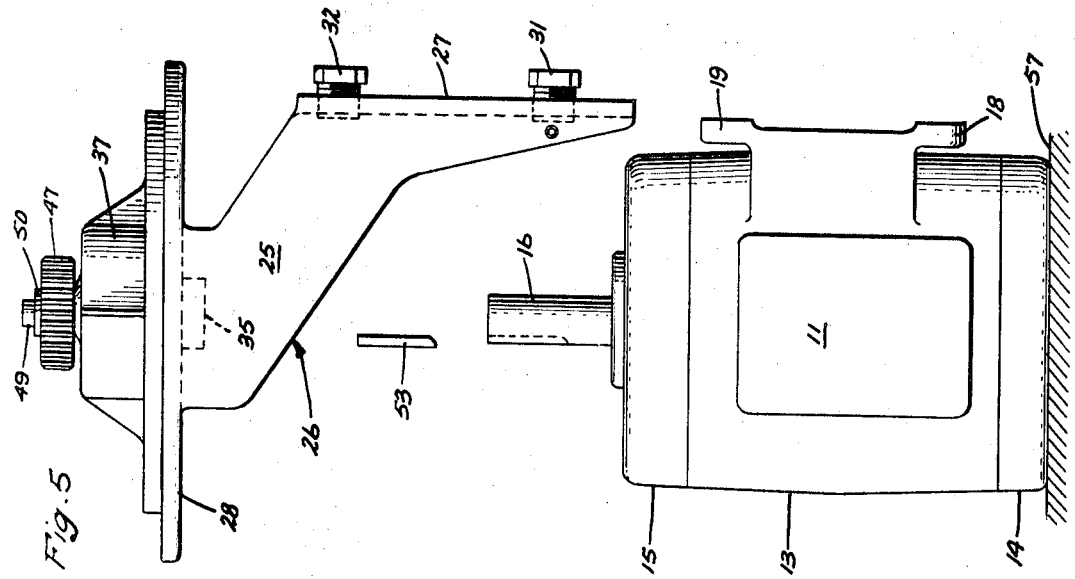
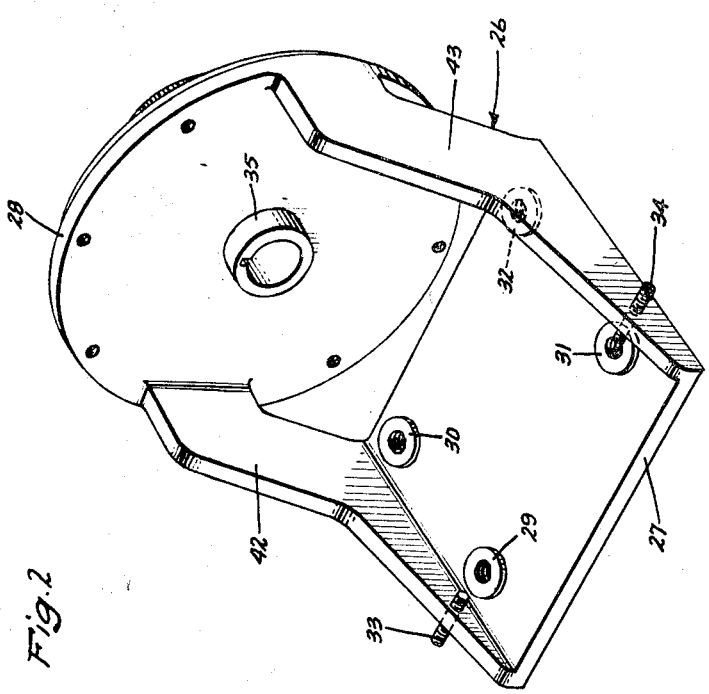

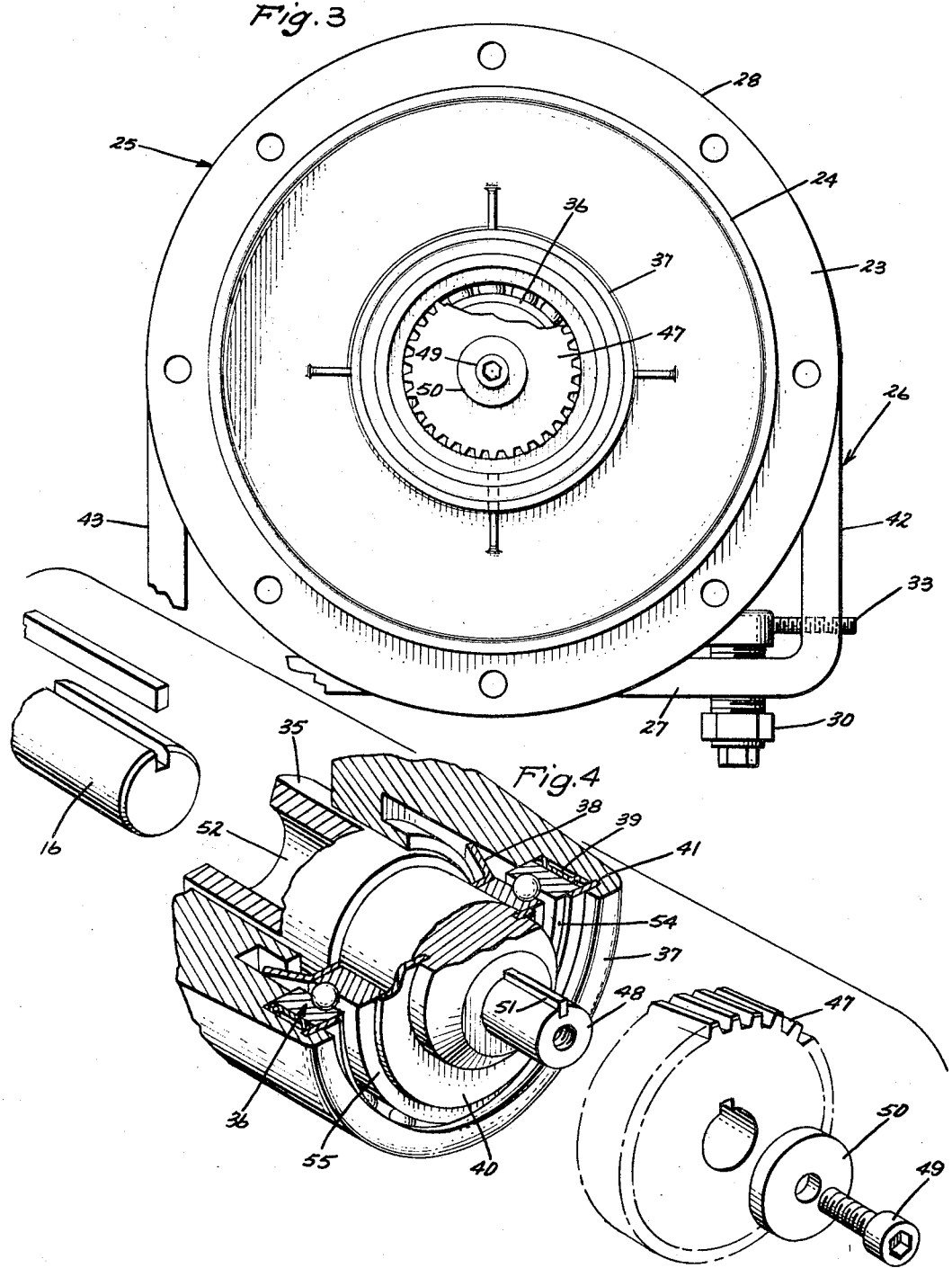

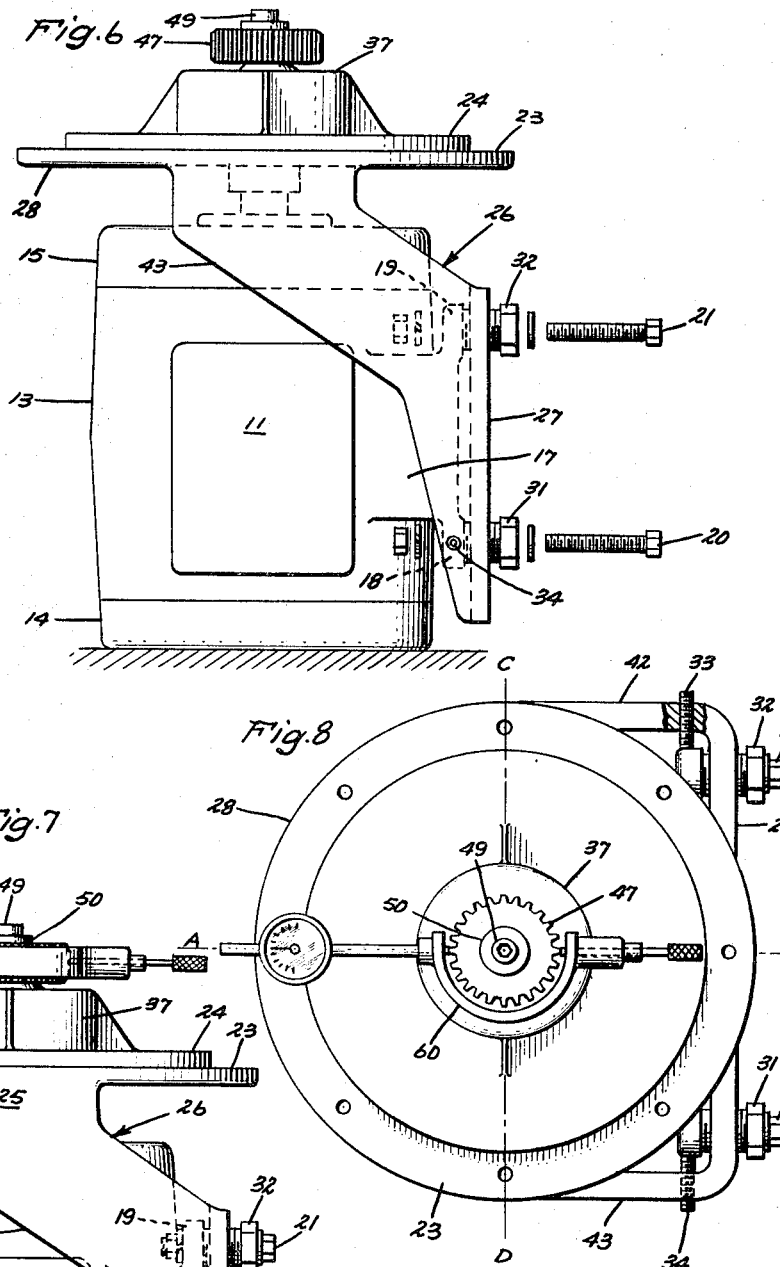

United States Patent Office 3,395,594
Patented Aug. 6, 1968

3,395,594
POWER UNITS SUCH AS GEAR MOTORS WITH
IMPROVED MOTOR BASE AND ADAPTER
ASSEMBLY
Ronald A. Blair, Pompton Plains, N.J., assignor to
General Electric Company, a corporation of New
York
Filed Oct. 20, 1966, Ser. No. 588,129
9 Claims. (Cl. 74—606)

This invention relates generally to motor power units. More specifically it relates to an improved standard footed motor base and adapter assembly for a gear box or other driven unit and a method for aligning a footed motor with respect to the base and adapter assembly.

It will be appreciated that commercially available footed motors have mounting feet that are not accurately dimensioned. As a result, the motor shaft of such footed motors cannot be precisely aligned with a driven unit by simply bolting the motor to a support base. By way of illustration, in a 180 frame size motor the permissible tolerance between the shaft center line height measured from the plane of the mounting feet is $1/32$ of an inch. Precise alignment is difficult to achieve by the use of shims or other means since the motor support base does not provide any accurate reference point.

It is commonly used arrangement, know as an all-motor gear motor, a footed motor is mounted on the support base for the motor and driven unit. To operate satisfactorily in such applications, it is necessary that the shafts of both the motor and the pinion shaft of the gearing unit be properly aligned. In such all-motor gear motors flexible coupling members are used to accommodate any misalignment that may exist between the driving and the driven shafts. A disadvantage of such a conventional arrangement is that a means for the flexible coupling between the driving and driven shaft results in an increase in the overall length of the unit. In some applications the space requirements do not permit the use of a flexible coupling.

A conventional integral type gear motor may be used in applications where space requirements are critical. In a conventional integral type gear motor, the end shield must be formed with a special machined face which is adapted to mate with a machined face on the housing of the gearing or other driven unit. Thus, the alignment between the motor and the driven unit is achieved by accurately machining the mating surfaces. Such a conventional arrangement possesses the inherent disadvantage that in the event of a motor failure a motor with a special flange machined to accurate tolerances must be procured. Such motors are not normally carried in stock by motor repair shops, and consequently replacement of such a motor cannot generally be expeditiously effected.

Accordingly, it is a general object of my invention to provide an improved power unit such as a gear motor.

It is a more specific object of the present invention to provide an improved power unit wherein the driving unit can be readily aligned with the driven unit.

Another object of the invention is to provide an improved motor power unit wherein a standard footed motor can be utilized to drive the driven unit.

A further object of the invention is to provide an improved support base adapter that readily permits a standard footed motor to be aligned with a driven unit.

In accordance with one form of my invention, I have provided an improved power unit such as a gear motor comprising a motor having a drive shaft and a support base for mounting the motor and a gearing unit having a housing within an end wall with an opening formed therein. According to an important aspect of my invention, I have provided a motor base adapter having a positioning plate member with a registration portion that extends into the opening of the housing. The motor base adapter also includes a motor base support member disposed essentially in perpendicular relationship with respect to the positioning plate member and formed integral therewith. Further, the positioning plate member has formed thereon a hub portion arranged so that one end of the drive shaft projects outwardly into the hub portion and is coupled with a gear of the gearing unit. A means is provided for adjustably securing and positioning the support base of the motor in a predetermined position with respect to the positioning plate member. I have also provided a means for releasably connecting the positioning plate member to the end wall having the opening therein thereby to effect a connection. By connecting the positioning plate member to the end wall, the preselected alignment of the motor with respect to the gearing or driven unit is achieved.

The subject matter which I regard as my invention is particularly pointed out and distinctly claimed in the concluding portion of the specification. My invention, however, together with further objects and advantages thereof may be best understood by reference to the following description taken in conjunction with the accompanying drawings in which:

FIGURE 2 is a perspective view of the support base adapter utilized in the embodiment of the invention shown in FIGURE 1;

FIGURE 3 is an enlarged end view of the motor and support base adapter assembly with the motor and pinion shown in assembled relation on the adapter stub shaft;

FIGURE 4 is an exploded fragmentary view in perspective of the coupling arrangement between the motor shaft and the pinion gear;

FIGURE 5 is a side view of the footed motor shown in FIGURE 1 positioned at one end and showing the motor and support base adapter assembly and pinion gear in position over the motor shaft, the view illustrating the first step of the assembly prcedure;

FIGURE 6 is a view corresponding to the view shown in FIGURE 5 illustrating th motor base assembly positioned on the motor shaft with the motor foot bolts shown in exploded view;

FIGURE 7 is a view corresponding to the one shown in FIGURE 6 wherein a dial indicator is clamped on the pinion;

FIGURE 8 is a top view of the motor and base adapter assembly and dial indicator corresponding to the view shown in FIGURE 7.

Figure 1:
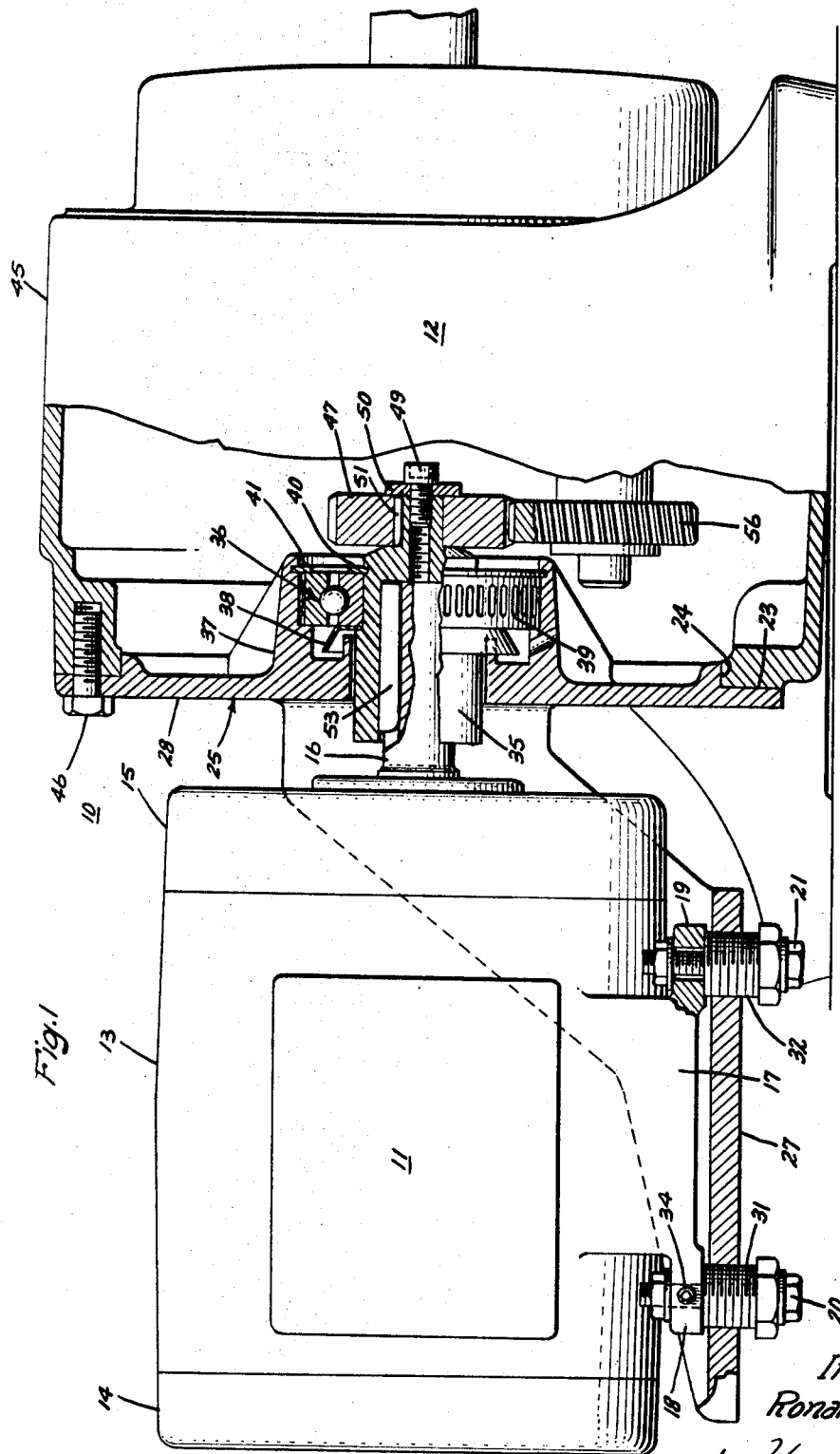
FIGURE 1 is a side elevation of one embodiment of my invention, the view being shown partially in section.

Referring now more particularly to FIGURES 1 through 4 of the drawings, I have illustrated therein, by way of exemplification of one form of my invention, a gear motor 10. The driving unit of the gear motor 10 is a standard footed motor 11 conforming with the National Electrical Manufacturers Association Standard MG1 and is arranged to drive a gearing unit generally identified by the reference numeral 12. The motor 11 includes a frame 13, end shield members 14, 15, a shaft 16, and a base 17 with four foot portions which are adapted for receiving four foot bolts. Only two of the foot portions and bolts can be seen in the view shown, these foot portions being identified respectively by the reference numerals 18 and 19 and bolts being identified respectively by the reference numerals 20 and 21.

An important feature of the present invention resides in the overall arrangement and manner in which accurate alignment of a footed motor with a driven unit is achieved through a novel support base adapter assembly 25, which I will now more fully describe. As is best seen in FIGURES 2, 3 and 4, the base adapter assembly 25 includes a base adapter member 26 having an integrally formed cantilevered base support plate member or shelf 27 and positioning plate member 28, four adjustable bushings 29, 30, 31 and 32, two side adjusting screws 33, 34, a pinion shank 35, a ball bearing 36 supported in a hub 37 formed as an integral part of the base adapter 26, an oil deflector 38, a resilient tolerance ring 39 interposed between the ball bearing 36 and hub 37, and split rings 40, 41.

As is best seen in the view of FIGURE 2, the cantilevered shelf 27 for supporting the motor 11 is carried by a pair of arms 42, 43 which extend from the positioning plate member 28. It will be noted that the four threaded bushings 29, 30, 31 and 32 are located on the cantilevered shelf 27 so as to underlie the foot portions 18, 19 of the motor base 17. The two side adjusting screws 33, 34 are located at the sides of the base adapter member 26 so that pivotal adjustment of the motor 11 can be readily effected.

The positioning plate member 28 of the support base adapter 26 is formed with a vertically extending machined surface 23 and a horizontally extending machined surface 24 (as shown in FIGURE 1) that engage corresponding mating surfaces which define an opening in the gear housing 45. Thus, it will be seen that the support base adapter assembly 25 is positioned with respect to the gear housing 45 by means of a circumferential rabbet fit and is secured thereto by means of a plurality of symmetrically spaced bolts 46 threaded into the housing. The support base adapter assembly 25 may be of cast or fabricated construction.

An important feature of the adapter arrangement is that it is possible to readily remove the motor and support base adapter assembly 25 for the purpose of servicing the gears or other parts of driven unit or for the purpose of installing a new motor. After the gear motor 10 has been serviced, the motor and the support base adapter assembly 25 can be replaced without disturbing the original alignment of the motor 10 where repairs have been effected only to the driven unit. If the motor is replaced, the new motor can be aligned with respect to the support base adapter assembly 25 on a bench or other suitable location. Although in the illustrated embodiment of my invention the base support plate member 27 of the support base adapter assembly 25 was overhung from the gear housing 45, it will be appreciated that the driven unit 12 may be overhung and supported from support base adapter assembly 25 or both the motor 10 and the driven unit 12 may be mounted on a common bed plate.

Turning now to FIGURE 4, I will now describe more fully the coupling arrangement provided between the motor shaft 16 and the pinion 47. The pinion 47 is held in an axial position on a stub shaft 48 by means of a screw 49 and washer 50, and in nonrotatable relation with respect to the stub shaft 48 by a key 51. It will be seen that the motor shaft 16 extends into a bore 52 formed in the pinion shank 35 and is held in engagement with the pinion shank 35 by means of a key 53 which is adapted to fit in keyways formed in the bore 52 of the pinion shank 35 and in the motor shaft 16. The ball bearing 36 includes an outer bearing race 54 which is held in position in the hub 37 by means of the split ring 41, the inner ball race 55 is pressed on the pinion shank 35, and the split ring 40 locks the inner race 55 in position on the shank 35. The oil deflector 38 is held in position against a shoulder formed on the shank 35 by the inner race 55. The resilient tolerance ring 39 is used between the outer ball bearing race 54 and the pinion shank 35 to permit the bearing 36 to be assembled within the shank bore without need for close tolerances.

In the illustrated embodiment of my invention I have shown the improved support base adapter assembly 25 for use in conjunction with the gearing unit 12. The gear housing 45 has an end wall machined to provide mating surfaces for machined faces 23, 24 on the positioning plate member 28. In the broken-away portion of the gearing unit 12 as shown in FIGURE 1, only the pinion 47 and one gear 56 of the gear train of the gearing unit are illustrated. The other elements of the gearing train are not illustrated since the details of the gear train itself form no essential part of the present invention. Although a gearing unit has been used to exemplify one form of my invention, it will be appreciated that the support base adapter assembly of this invention can be readily adapted for use in conjunction with driven units such as pumps which are directly coupled and may not use a gear drive.

Having more specific reference now to FIGURES 5 through 9, I will now more specifically describe how the motor 11 is aligned with respect to the support base adapter assembly 25 in accordance with the present invention. The motor 11 is placed on a work table 57 with the shaft end up as shown in FIGURE 5. The support base adapter assembly 25 is placed in assembled relation with the motor 11 by placing the support base adapter assembly 25 into position so that the shaft 16 is keyed to the pinion shank 35. The motor 11 is positioned so that holes in the foot portions 18, 19 are over the bushings 31, 32. The motor foot bolts 20, 21 and the two other bolts (not shown) are then assembled through the bushings and foot portions (see FIGURE 6).

The two side adjusting screws 33, 34 and the four motor foot bolts are loose and all of the threaded bushings 29, 30, 31 and 32 are backed away from the motor foot portions until they no longer contact the foot portions. A dial indicator 60 is then clamped to the pinion 47 as shown in FIGURES 7 and 8 in order that the runout of the positioning plate member 28 may be measured. The dial indicator 60 is set to position A as shown in FIGURE 8, and a reading is taken. The dial indicator is then swept through 180 degrees to position B which is diametrically opposite the position A. The two lower bushings are then backed in against the foot portion to reduce by one-half the total reading on the indicator 60. The indicator 60 is then swept back to position A, and the lower pair of threaded bushings 29, 31 are adjusted to reduce by one-half the reading on indicator 60. This procedure is repeated until the total indicator reading obtained by alternately sweeping the indicator 60 from position A to B is assumed to be, considering the requirements of surface 23 runout (and surface 24 concentricity) necessary for proper operation of the assembled gear motor 10 in the illustrated exemplification of my invention, about .002 of an inch or less. The two lower motor foot bolts are then tightened by hand.

The dial indicator 60 is now set at position C and then is swept to position D. The two side adjusting screws 33, 34 are simultaneously adjusted to reduce by one-half the dial indicator reading. The dial indicator 60 is then rotated to position C, and the side adjusting screws 33, 34 are adjusted to reduce by one-half the total indicator reading. This procedure is repeated until the total indicator reading is .002 of an inch or less. The two upper threaded bushings 30, 32 are then backed in against the two upper foot portion of the motor 11 until the bushings 30, 32 contact the foot portions. All four of the motor foot bolts are then tightened securely.

Figure 9:
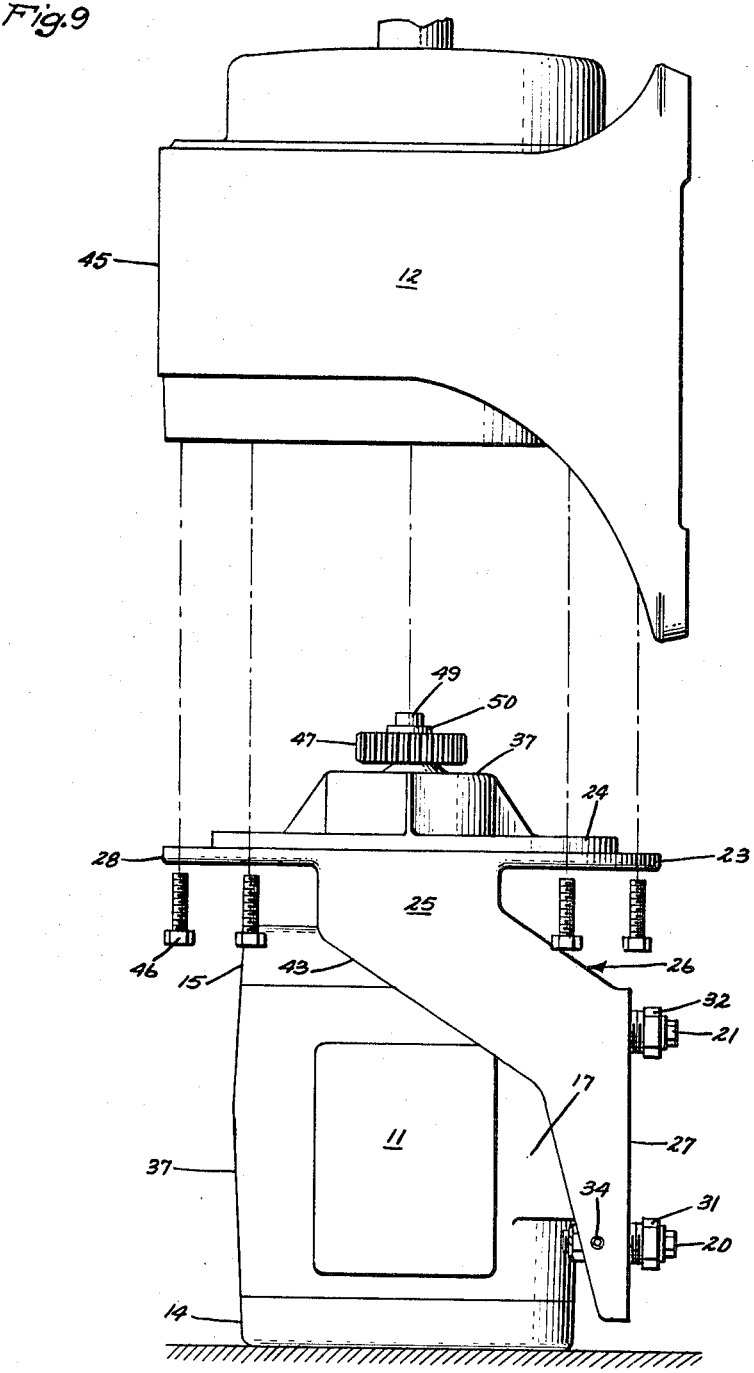
FIGURE 9 is a side view showing the motor in a vertical position with the gearing unit in position for assembly therewith.

In the given exemplification of the invention, the alignment was achieved when the dial indicator reading in all of the positions A, B, C and D did not exceed .0025 of an inch. With the motor 11 now aligned with the support base adapter assembly, the motor and adapter assembly may now be attached to the gearing unit as shown in FIGURE 9.

From the foregoing description of a preferred exemplification of my invention, it will be apparent that an improved arrangement is provided for coupling a footed motor to a driven unit such as a speed reducer or other driven unit. An important advantage of the improved arrangement is that a standard footed motor can be utilized in a large number of applications without the need for a flexible coupling between the motor and the driven unit. Further, the improved arrangement permits the motor and the adapter assembly to be removed from the driven unit without disturbing the alignment thereby facilitating and simplifying repairs. Also, the improved arrangement eliminates the need in some applications for special flange mounted motors. Although I have described my invention in connection with a specific embodiment, it will be appreciated that many modifications may be made thereto without departing from the invention. It is therefore intended by the appended claims to cover all such modifications that fall within the true spirit and scope of the invention.

What I claim as new and desire to secure by Letters Patent of the United States is:

1. A gear motor comprising: a footed motor having a drive shaft and a support base for mounting said footed motor, a gearing unit having a housing with an opening formed therein; a support base adapter including a positioning plate member formed with a projection extending from said positioning plate member and engaged in abutting relation with said opening of said housing, said support base adapter also including a motor base support member disposed essentially in perpendicular relationship with respect to said positioning plate member, said positioning plate member having a hub portion centrally located thereon and anti-friction bearing means mounted in said hub portion and including bearing race means; annular resilient means disposed between said bearing race means and said hub portion; a rotatable shaft adapter journaled in said bearing means, said rotatable shaft adapter having a hollow section and a stub shaft mounting a pinion gear of said gearing unit, said drive shaft of the footed motor having one end projecting outwardly into said hollow section of said rotatable shaft adapter and terminating therein; means joining said drive shaft with said rotatable shaft adapter for simultaneous rotation therewith; and means adjustably securing and positioning said support base of the footed motor on said motor base support member to maintain the drive shaft in a preselected alignment with respect to the positioning plate member thereby effecting an alignment of the footed motor with respect to the gearing unit when the projection of said positioning plate member is engaged in said abutting relation with said opening of said housing.

2. A gear motor comprising: a motor having a drive shaft and a support base for mounting the motor; a gearing unit having a housing with an end wall having an opening therein, a motor base adapter including a positioning plate member with a registration portion extending into the opening of said housing and also including a motor base support member disposed essentially in perpendicular relationship with respect to said positioning plate member and being integral therewith, said positioning plate member having formed therein a hub portion, and said drive shaft having one end projecting outwardly into said hub portion and coupled with a gear of said gearing unit; means for adjustably securing and positioning said support base of the motor in a predetermined position with respect to said positioning plate member; and means releasably connecting said positioning plate member to said end wall with the opening therein to effect a connection therebetween, said connection of said positioning plate member to said end wall arranging said motor in preselected alignment with respect to the gearing unit.

3. The gear motor set forth in claim 2 wherein said registration portion comprises an annular shoulder formed on said positioning plate member.

4. The gear motor set forth in claim 2 wherein said means for adjustably securing and positioning said support base includes a plurality of bushings.

5. A motor and support base adapter assembly for driving a driven unit, said motor and support base assembly comprising: a motor having a drive shaft and a support base for mounting the footed motor; a support base adapter having a positioning plate member with a registration portion for engagement with a complementary portion of the driven unit, said support base adapter also having a motor base support plate member disposed essentially in perpendicular relationship with respect to said positioning plate member; a shaft adapter rotatably supported in said positioning plate member, said shaft adapter having a hollow section and said drive shaft of said motor having one end projecting outwardly into the confines of said hollow section and terminating therein; means connecting said drive shaft and shaft adapter for simultaneous rotation therewith; and means adjustably securing and positioning the motor base to said motor base plate member thereby to maintain a predetermined position of the drive shaft with respect to the registration portion of said plate positioning member, said registration portion when engaged in assembled relation with respect to a driven unit effecting a preselected alignment between the motor and driven unit.

6. The motor and support base adapter assembly set forth in claim 5 wherein said registration portion comprises an annular shoulder formed on said positioning plate member.

7. The gear motor set forth in claim 5 wherein said means for adjustably securing and positioning said support base includes a plurality of bushings.

8. A power unit comprising: a driven unit with a housing formed with an opening; a support base adapter including a positioning plate member having a registration portion disposed in said opening of the housing of said driven unit and also having a motor base support member extending substantially at right angles with respect to said positioning plate member, said positioning plate member having a hub portion; a rotatable shaft adapter supported for rotation in said hub portion and having a hollow section; a footed motor having a drive shaft and a support base mounted on said support member of the support base adapter; means for adjustably attaching said support base to said support member in a predetermined position to align said drive shaft with respect to the registration portion of said support base adapter, said drive shaft of said footed motor extending into the hollow section of said rotatable shaft adapter and terminating therein; means coupling said rotatable shaft adapter with said drive shaft for rotation therewith; and means releasably connecting said positioning plate member to the housing of the driven unit to effect a connection therebetween, said connection of said positioning plate member to said housing placing said footed motor in preselected alignment with respect to the driven unit.

9. A power unit comprising: input power means including a housing, a drive shaft rotatably supported in said housing and a support base for mounting said input power means; output power means having a housing with an opening formed at one end thereof; a support base adapter including a removable positioning plate member having a registration portion extending into the opening of said output power means for aligning said positioning plate member radially and axially with respect to said output power means, said positioning plate member having a hub portion with a hollow portion and a rotatable shaft adapter rotatably supported in said hub portion, said drive shaft having one end projecting outwardly into the confines of said hollow portion and terminating therein, said support base adapter also including a support plate member extending essentially at right angles with respect to said positioning plate member, and said support base of said input power means being secured to said support base member in prepositioned relationship with respect to said registration portion to effect a preselected alignment of said input power means with respect to said output power means; means joining said drive shaft and said rotatable shaft adapter for simultaneous rotation; and means releasably connecting said positioning plate member in engagement with said opening of said output means, said engagement of said registration portion of said positioning plate member with said opening effecting said preselected alignment.

References Cited

UNITED STATES PATENTS

| | | | |
|---|---|---|---|
| 1,637,106 | 7/1927 | Cullman | 74—606 XR |
| 1,971,968 | 8/1934 | Schmitter | 74—606 XR |
| 1,988,338 | 1/1935 | Schmitter. | |
| 2,101,515 | 12/1937 | Schmitter. | |
| 2,578,446 | 12/1951 | O'Daniel. | |
| 2,755,686 | 7/1956 | Bade. | |
| 2,918,825 | 12/1959 | Bade. | |

FOREIGN PATENTS 504,653   7/1951   Belgium.

FRED C. MATTERN, Jr., *Primary Examiner.*

F. D. SHOEMAKER, *Assistant Examiner.*